W. A. TURBAYNE.
VARIABLE SPEED MOTOR.
APPLICATION FILED DEC. 31, 1912. RENEWED SEPT. 19, 1917.
1,250,719.	Patented Dec. 18, 1917.
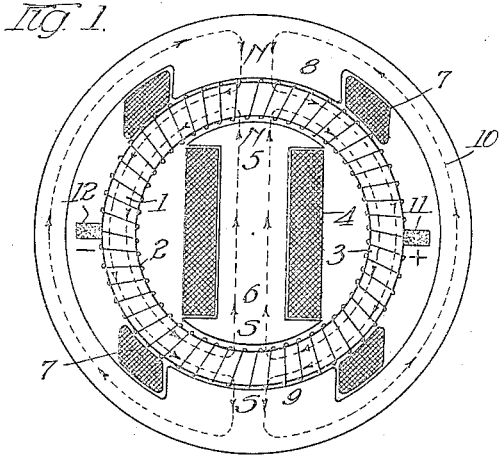
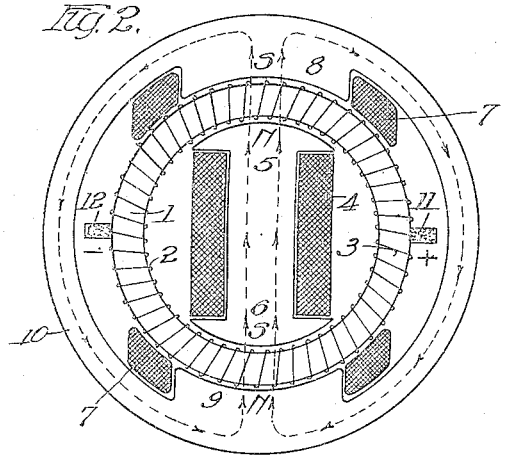
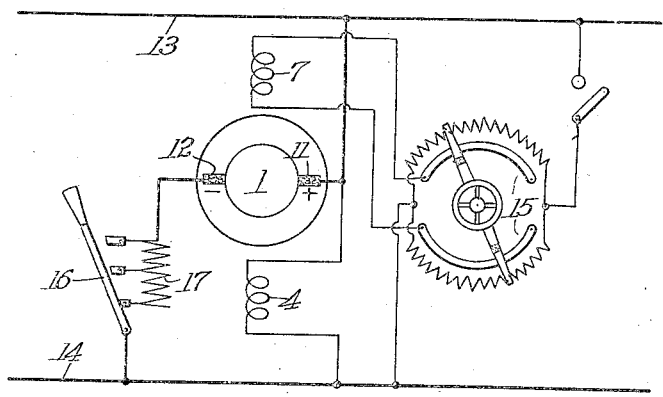
Witnesses:
Robert H. Weir
R. H. Van Nest
Inventor:
William A. Turbayne
by Edwin B. H. Tower Jr.
Atty.

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

VARIABLE-SPEED MOTOR.

1,250,719.     Specification of Letters Patent.     Patented Dec. 18, 1917.

Application filed December 31, 1912, Serial No. 739,433. Renewed September 19, 1917. Serial No. 192,226.

*To all whom it may concern:*

Be it known that I, WILLIAM A. TURBAYNE, a citizen of the United States, residing at Niagara Falls, in the county of Niagara and State of New York, have invented new and useful Improvements in Variable-Speed Motors, of which the following is a full, clear, concise, and exact description, reference being had to the accompanying drawing, forming a part of this specification.

This invention relates to improved variable speed motors.

The usual method of varying the speed of motors is by changing the effective number of ampere turns acting on the field poles either by altering the value of the resistance in circuit with the field winding or by cutting in and out opposing turns. In certain operations, such as in the driving of certain classes of machine tools, wide variations in speed are necessary, the maximum speed often being several times the minimum speed. At the high speeds the field flux becomes so weakened that the disturbing effects of the armature current are very pronounced. In order to obtain satisfactory commutation the disturbing effects of the armature current must be counteracted. This may be accomplished by adding compensating windings or by providing commutating poles. With these methods, however, extremely high voltages are liable to be developed across portions of the armature winding and instability of operation is liable to result.

An object of this invention is to provide a motor in which very wide speed variations may be secured.

Another object of the invention is to provide a motor having improved means for reducing the effects of armature reaction at high speed.

Another object of the invention is to provide a motor operating without compensating windings or commutating poles over very wide ranges of speed, in which the effects of the armature reaction are no more pronounced at the high speeds than at the low.

An embodiment of the invention by which these and other objects may be accomplished is illustrated in the accompanying drawing, in which:

Figure 1 represents diagrammatically a motor under minimum speed conditions.

Fig. 2 represents diagrammatically a motor under maximum speed conditions.

Fig. 3 represents diagrammatically the circuit connections for the motor.

For simplicity in explanation a bipolar construction has been illustrated although, of course, in actual practice a multipolar construction would preferably be utilized.

The motor comprises a rotating armature of the ring type and fixed internal and external field members.

The armature 1 is of the Gramme or ring type in which a suitable number of turns 2 are wound on an annular core 3.

The internal field is energized by windings 4 on suitable poles 5 and 6.

The external field is energized by windings 7 on suitable poles 8 and 9 connected by circular field yoke 10.

Brushes 11 and 12 are arranged at proper points of commutation at right angles to the flux axis and bear on a commutator ring, not shown, which will be connected to the armature winding in the usual manner.

Fig. 3 illustrates the preferred manner of connecting the motor in circuit. The internal field windings 4 are connected directly across the supply mains 13 and 14. The external field windings 7 are preferably connected across the supply mains through a reversible rheostat 15, by means of which the current through the external field may be made to vary from zero value to a maximum value in either direction. The motor armature is adapted to be connected across the supply mains by means of a starting switch 16 coöperating with a starting resistance 17.

The conditions for minimum speed are illustrated in Fig. 1 in which the dotted lines indicate the magnetic flux, the arrowheads indicating the direction thereof. Under these conditions both external and internal field poles are magnetized in the same sense, the upper poles, as illustrated, being of N polarity and the lower poles being of S polarity. The magnetic flux contributed by both sets of poles will, therefore, pass through the armature core in the same direction and a field of maximum strength will be provided. By connecting brush 11 to the positive side and brush 12 to the negative side of the supply mains the armature will rotate in a clockwise direction at a minimum speed.

By weakening the exciting current through the windings 7 the total flux entering the armature will be reduced and the armature speed increased, although the flux imparted by the internal windings 4 will remain constant.

By a continued weakening of the current through coils 7 further speed increase will result and by reversing and again increasing the current through these coils any degree of speed may be obtained.

The conditions of maximum speed are illustrated in Fig. 2. Under these conditions by reversing the current through the coils 7 adjacent external and internal poles are of opposite polarity. Magnetic flux will accordingly be diverted from the armature core and directed through the external field yoke, the flux through the internal poles, however, maintaining its original direction. The magnetic flux in thus crossing the external air gap in this direction will induce in the outer armature turns an E. M. F. which is in opposition to the E. M. F. induced in the inner turns adjacent the inner poles. Thus while the E M. F. set up in the inner turns will be a C. E. M. F. tending to oppose the E. M. F. impressed across the brushes, the E. M. F. set up in the outer turns will be in a direction to assist the impressed voltage.

If the effect of the outer coils be as great as the effect on the inner coils, a destructive speed would result. The magnetizing value of the external field poles should, therefore, be less than the magnetizing value of the internal field poles.

It is apparent that a motor of this type may be operated over wide ranges of speed. The speed variations are not obtained by proportionately weakening the effective magnetic flux but by diverting flux from the armature core and by developing in certain of the armature conductors, by action of this diverted flux, an E. M. F. which acts in the direction of the impressed supply voltage and, therefore, in opposition to the motor C. E. M. F. which, in any motor, determines its speed.

Also since neither does the flux in the internal poles become changed in direction or magnitude nor the symmetry axis of the field become altered, this machine will commutate just as well at the high speeds as at the low so far as any distortion effects of the armature current on the flux is concerned.

The embodiment of the invention herein described is merely for the purposes of illustration, it being understood that many different arrangements and modifications may be made which fall within the scope of the invention. Thus any preferred means, either manually or automatically controlled, may be employed for varying the strength and direction of magnetization in the reversible field, and this may be either the external or the internal field. The motor may be constructed in any preferred manner to meet the conditions of the particular service it is designed to perform.

I claim:

1. A variable speed motor provided with a ring-wound armature, internal field poles and reversible external field poles.

2. A variable speed motor comprising field poles, a rotatable armature surrounding said field poles, and additional field poles arranged around said armature, said additional field poles being mechanically fixed with relation to said first field poles, one set of said field poles being reversible in polarity.

3. A variable speed motor provided with a ring-wound armature, internal field poles, external field poles, and means whereby one set of said field poles may be energized to set up a flux through the armature in the same direction as the flux set up by the other set of poles or in a direction to divert flux from said armature.

4. A variable speed motor provided with a ring-wound armature and internal and external field poles, one of said sets of field poles being reversible in polarity.

5. A variable speed motor provided with a ring-wound armature, and separate sets of field poles internal and external respectively with relation to said armature, one of said field poles being reversible and variable in strength from zero to a maximum in either direction.

6. A variable speed motor provided with a ring-wound armature, internal field poles of constant strength, and an external field pole opposite each internal field pole, said external field poles being adapted to be energized from zero to a maximum in either direction.

7. A variable speed motor provided with a ring-wound armature, internal field poles of constant strength and polarity, external field poles, and means for varying and reversing the magnetization of said external field poles.

8. A variable speed motor comprising a ring-wound armature, internal field poles energized by windings connected across the supply mains, external field poles provided with windings adapted to be connected across the supply mains, and a reversible rheostat in circuit with said external field poles whereby the energization thereof may be varied from zero to a maximum in either direction.

9. A method of regulating a motor having a ring-wound armature, which consists in setting up a field in position to be cut by the external turns of said armature, setting up an additional field in position to be cut by the internal turns of said armature and varying and reversing one field at will so as to reinforce the flux of the first field or divert said flux from the armature.

In witness whereof, I have hereunto subscribed my name in the presence of two witnesses.

WILLIAM A. TURBAYNE.

Witnesses:
L. A. PETTEBONE,
N. MARTIN.